United States Patent Office 3,007,877
Patented Nov. 7, 1961

3,007,877
METHOD OF MAKING NODULES CONTAINING ALKALI METAL HYDROXIDE
Edward M. Allen, Wadsworth, Ohio, assignor, by mesne assignments, to Pittsburgh Plate Glass Company
No Drawing. Filed Nov. 5, 1953, Ser. No. 390,419
5 Claims. (Cl. 252—135)

This invention relates to the manufacture of compositions containing an alkali metal hydroxide in substantially homogeneous, non-dusting nodular form.

Prior to the present invention, it has been known to mix alkali metal hydroxides with other solids. For example, mixtures of anhydrous flake caustic soda and a cleansing agent such as trisodium phosphate or sodium pyrophosphate have been prepared for use as detergents. Such mixtures contain discrete particles of each ingredient. The sodium phosphate is generally a pulverulent solid of finer particle size than the caustic soda, so that some separation occurs in mixtures of the two. This causes the ratio of caustic soda to sodium phosphate to vary somewhat, resulting in harm to fabrics when the percentage of caustic is too high and incomplete removal of dirt when the percentage is too low.

Stratification also occurs in solid mixtures of alkali metal hydroxides with other compounds due to differences in the particle sizes of the two ingredients, so that the mixtures are not of uniform composition.

Other difficulties are encountered in mixtures of caustic soda with other compounds. The caustic is hygroscopic, so that a small amount of a material capable of absorbing surface moisture should be added to the mixture to render it non-hygroscopic. Sodium carbonate and amorphous silica are examples of materials suitable for this purpose. On the other hand, dry mixtures of anhydrous caustic with finely divided solids tend to be dusty.

It has been found according to the present invention that various substances in finely divided particulate form can be mixed with particles of an alkali metal hydroxide to form dust-free nodules of substantially uniform predetermined composition. According to this invention, such mixtures may be prepared by subjecting solid alkali metal hydroxide to a humid atmosphere to increase the moisture content thereof (preferably to produce a tacky surface) and mixing the treated alkali metal hydroxide with the solid or solids which form the other components of the mixture.

In a preferred mode of the practice of the present invention flakes of substantially anhydrous sodium hydroxide are steamed with saturated steam to moisten the surfaces thereof. The steam is supplied until the surfaces of the caustic are visibly moist and slightly gray. A finely divided solid, having a particle size smaller than that of the sodium hydroxide flakes, preferably about 60 mesh or finer, is then admixed with the sodium hydroxide, adhering to the moist surfaces. The mixture is tumbled or otherwise agitated to mix the two ingredients uniformly.

A variety of solid substances can be admixed with sodium hydroxide according to this invention. Alkali metal phosphates such as trisodium phosphate and tetrasodium pyrophosphate are particularly useful in this regard in the preparation of detergents, as has already been mentioned. Sodium silicate may also be mixed with caustic soda to form a detergent. Hydrated silica may also be admixed with sodium hydroxide and the mixture may be used as a substitute for sodium silicate in numerous applications. Organic compounds in finely divided solid particulate form, as for example gluconic acid and sodium gluconate, which form with sodium hydroxide a mixture which is useful in prevention of boiler scale, may also be mixed with an alkali metal hydroxide according to the present invention.

The finely divided solid is preferably mixed with caustic soda in a plurality of steps with addition of steam prior to and tumbling after each step. Tumbling causes the ingredients to be uniformly mixed and to form nodules essentially spherical in shape. Addition of the finely divided solid in a plurality of steps minimizes agglomeration of the finely divided solid, which occurs when a large quantity is added at one time, in the presence of moisture. The total amount of steam supplied varies considerably depending on atmospheric conditions. Longer periods of steaming are necessary during the winter, when the moisture content of the atmosphere is low, than during summer, when the moisture content is high. The amount of steam added is such as will impart a moisture content of about 3 to 5 percent by weight in the final product. The optimum moisture content is around 3.5 percent.

After the addition of finely divided solid to caustic is complete and the substances thoroughly mixed, a small amount of a substance which is capable of absorbing surface moisture is added to the mixture. Typically this substance constitutes about one to three percent of the total weight of the mixture. Amorphous silica in finely divided form has been found to remove surface moisture without causing dusting of the nodules, so that coherent nodules which are dry and not tacky may be produced. Sodium carbonate may also be used to remove surface moisture.

In the preparation of detergents according to the present invention it is desirable to add a wetting agent to reduce surface tension when the material is dispersed in water. The wetting agent is conveniently added after the admixture of caustic soda and sodium phosphate is complete, although it may be added at any time in the process. Either a solid or a liquid wetting agent may be used. When a liquid is used (as for example an alkyl dimethyl benzyl ammonium chloride, which has been found to be especially suitable in detergent compositions of caustic soda and a sodium phosphate), the amount of moisture absorbing agent is somewhat larger than would otherwise be the case.

The following examples are given as illustrative of the present invention:

*Example I*

One thousand two hundred and seventy-five pounds of solid anhydrous sodium hydroxide in flakes ranging from about one-fourth of an inch to about three-fourths of an inch maximum dimension were charged to a concrete mixer of 1½ cubic yards capacity. Saturated steam at 40 pounds per square inch gauge was charged to the mixture through a pipe of ¼ inch inside diameter for 15 minutes. The mixer was rotated at about 4 revolutions per minute during the steam addition, and was thereafter rotated in the opposite direction at the same speed for five minutes. Seventy-six and one-half pounds of anhydrous tetrasodium pyrophosphate as particles 60 mesh or finer was added, and the mixer was rotated for 5 minutes at 4 r.p.m. Saturated steam at 40 p.s.i.g. was again supplied for 15 minutes. The mixer was rotated in the opposite direction five minutes. A second portion of sodium pyrophosphate containing 76.5 pounds was added, the mixer was again rotated five minutes, and steam was added over a nine-minute interval. After rotation of the mixer in the opposite direction for five minutes, the third portion of sodium pyrophosphate, containing 76.5 pounds, was added. The mixer was again rotated five minutes, steam was added for five minutes, and the mixer was rotated in the opposite direction five minutes.

Nodules consisting of sodium hydroxide, sodium pyrophosphate and a small amount of water were formed by the above procedure. A mixture containing 10.75 pounds of an alkyl dimethyl benzyl ammonium chloride and 9.25 pounds of finely divided hydrated silica was charged to the mixer while it was being rotated; this required 10 minutes.

The product was tumbled for 2 hours and 25 minutes by rotation of the mixer at 4 r.p.m. The product obtained was in the form of nodules about 1/10 of an inch and larger, up to about 3/4 of an inch. These nodules had a white interior consisting primarily of sodium hydroxide and sodium pyrophosphate with small amounts of moisture, and were coated with an alkyl dimethyl benzyl ammonium chloride and silica. The surfaces of the nodules were light yellow in color.

Analysis of the product showed the following:

| | Percent by weight |
|---|---|
| Sodium hydroxide | 80.4 |
| Sodium pyrophosphate | 14.5 |
| Alkyl dimethyl benzyl ammonium chloride | 0.7 |
| Silica | 0.6 |
| Water | 3.8 |

The foregoing example is illustrative of the preparation of a detergent in winter. The procedure is the same in summer except that, due to the higher moisture content in the atmosphere, less steam is required. Example II is illustrative of the preparation of a similar detergent in summer.

*Example II*

The procedure of Example I was followed except that the steaming periods following the three additions of tetrasodium pyrophosphate were 12, 6, and 3 minutes respectively. The amount of alkyl dimethyl benzyl ammonium chloride was 10.75 pounds, and the amount of silica 13 pounds. The product was cured by tumbling for 2 hours and 45 minutes. The mixer was rotated intermittently for the first hour and continuously for the remainder of the curing period.

Various modifications of the procedures illustrated in the foregoing examples may be made without departing from the present invention, the scope of which is limited only by the appended claims.

I claim:

1. A method which comprises mixing relatively large solid substantially anhydrous flake alkali metal hydroxide particles in a humid atmosphere to cause moistening of the surfaces thereof by the water vapor in the atmosphere and intermingling therewith finely divided solid particles smaller in size than the alkali metal hydroxide particles to form dust-free nodules.

2. A method which comprises tumbling anhydrous flake alkali metal hydroxide in a humid atmosphere to cause moistening of the flake surfaces to a tacky consistency by the water vapor in the atmosphere and intermingling therewith finely divided solid anhydrous tetrasodium pyrophosphate particles smaller in size than the alkali metal hydroxide flakes to form dust-free nodules.

3. A method which comprises introducing saturated steam into a zone of tumbling anhydrous alkali metal hydroxide flakes until the surfaces of said flakes acquire a tacky consistency and subsequently intermingling therewith finely divided solid anhydrous tetrasodium pyrophosphate particles smaller in size than the alkali metal hydroxide flakes to form dust-free nodules.

4. A method which comprises introducing saturated steam into a zone of tumbling anhydrous alkali metal hydroxide flakes until the surfaces of said flakes acquire a tacky consistency, intermingling therewith finely divided solid anhydrous tetrasodium pyrophosphate particles smaller in size than the alkali metal hydroxide flakes, to form dust-free nodules, tumbling the resulting mixture and adding a mixture of finely divided hydrated silica and a wetting agent.

5. The method of claim 4 in which the wetting agent used is an alkyl dimethyl benzyl ammonium chloride.

References Cited in the file of this patent

UNITED STATES PATENTS

| 1,979,926 | Zinn | Nov. 6, 1934 |
| 2,244,158 | Hubbard | June 3, 1941 |
| 2,351,559 | Treffler | June 13, 1944 |
| 2,515,880 | MacMahon | July 18, 1950 |